United States Patent
Cross et al.

(10) Patent No.: US 7,650,284 B2
(45) Date of Patent: Jan. 19, 2010

(54) ENABLING VOICE CLICK IN A MULTIMODAL PAGE

(75) Inventors: Charles W. Cross, Wellington, FL (US); Marc White, Boca Raton, FL (US)

(73) Assignee: Nuance Communications, Inc., Burlington, MA (US)

( * ) Notice: Subject to any disclaimer, the term of this patent is extended or adjusted under 35 U.S.C. 154(b) by 842 days.

(21) Appl. No.: 10/992,979

(22) Filed: Nov. 19, 2004

(65) Prior Publication Data
US 2006/0111906 A1   May 25, 2006

(51) Int. Cl.
G10L 21/00 (2006.01)
G10L 21/06 (2006.01)
G06F 3/16 (2006.01)

(52) U.S. Cl. .................. 704/275; 704/270; 704/276; 715/728

(58) Field of Classification Search ................... None
See application file for complete search history.

(56) References Cited

U.S. PATENT DOCUMENTS

| | | | |
|---|---|---|---|
| 5,774,859 A * | 6/1998 | Houser et al. ............... 704/275 |
| 5,884,266 A | 3/1999 | Dvorak | |
| 6,101,472 A | 8/2000 | Giangarra et al. | |
| 6,308,157 B1 * | 10/2001 | Vanbuskirk et al. ......... 704/275 |
| 6,456,972 B1 * | 9/2002 | Gladstein et al. ............. 704/257 |
| 6,493,670 B1 * | 12/2002 | Croft ............................ 704/270 |
| 6,604,075 B1 | 8/2003 | Brown et al. | |
| 6,604,076 B1 | 8/2003 | Holley et al. | |
| 7,052,459 B2 * | 5/2006 | Washburn et al. ............ 600/437 |
| 7,584,429 B2 * | 9/2009 | Fabritius ...................... 715/739 |
| 2001/0002466 A1 | 5/2001 | Krasle | |
| 2001/0047262 A1 | 11/2001 | Kurganov et al. | |
| 2002/0062216 A1 | 5/2002 | Guenther et al. | |
| 2003/0023444 A1 | 1/2003 | St. John | |
| 2003/0036906 A1 | 2/2003 | Brittan et al. | |
| 2003/0078781 A1 | 4/2003 | Julia et al. | |
| 2003/0182124 A1 | 9/2003 | Khan | |
| 2004/0030559 A1 * | 2/2004 | Payne et al. .................. 704/275 |
| 2005/0027538 A1 * | 2/2005 | Halonen et al. .............. 704/275 |

* cited by examiner

*Primary Examiner*—Matthew J Sked
(74) *Attorney, Agent, or Firm*—Wolf, Greenfield & Sacks, P.C.

(57) ABSTRACT

A method, system and apparatus for enabling voice clicks in a multimodal page. In accordance with the present invention, a method for enabling voice clicks in a multimodal page can include toggling a display of indicia binding selected user interface elements in the multimodal page to corresponding voice logic; and, processing a selection of the selected user interface elements in the multimodal page through different selection modalities. In particular, the toggling step can include toggling a display of both indexing indicia for the selected user interface elements, and also a text display indicating that a voice selection of the selected user interface elements is supported.

12 Claims, 3 Drawing Sheets

ENABLING VOICE CLICK IN A MULTIMODAL PAGE

BACKGROUND OF THE INVENTION

1. Statement of the Technical Field

The present invention relates to a user interface and more particularly to voice enabling a multimodal markup language defined user interface.

2. Description of the Related Art

The user interface of a computer program serves the function of receiving input from an end user for underlying program logic, and for providing output produced by the program logic. Initially a mere command prompt, the conventional user interface has evolved over time into the complex, graphical user interface familiar to most computing end users today. More recently, the graphical user interface has been rendered both portable and dynamic through the utilization of markup language and server page technologies, including the extensible hypertext markup language (XHTML).

Notwithstanding the tremendous advances in the visual user interface, the visual aspect can be appropriate in many circumstances. For instance, some applications are deployed in environments not conducive to the use of a keyboard and monitor. Examples include telephonic applications including interactive voice response systems and hands-free applications such as those deployed in an automobile, to name only a few. To accommodate these non-traditional environments, extensive use has been made of the audible user interface. In fact, whole technologies, including the voice extensible markup language (VoiceXML) have been developed to address this unique market segment.

Not all applications operate in an environment dominated by a particular modality of interaction. In fact, in some multimodal environments, often both audio and visual interface cues can be appropriate. Previously, multimodal environments required a separately specified user interface for each modality of interaction, including for instance an audio user interface and a graphical user interface. To generate a separate user interface for each specified modality of interaction, however, can be costly in terms of development time, expertise and maintenance.

Multimodal applications are computing applications which provide multiple interface types to accommodate the needs of prospective end users. Importantly, multimodal applications do not require separate user interfaces to accommodate each separate modality of interaction. Rather, the content of a multimodal application can specify the presentations and interactions in both visual and voice modalities. In most cases, the end user can choose a desired, most efficient input method for interacting with the underlying logic of the application.

Notably, the XHTML+Voice (X+V) markup language represents one technical effort to produce a multimodal application development environment. In X+V, XHTML and VoiceXML can be mixed in a single document. The XHTML portion of the document can manage visual interactions with an end user, while the VoiceXML portion of the document can manage voice interactions with the end user. The Multimodal Toolkit for WebSphere® Studio manufactured by IBM Corporation of Armonk, N.Y., United States incorporates X+V support in developing multimodal applications.

In X+V, command, control and content navigation (C3N) can be enabled while simultaneously rendering multimodal content. The X+V profile specifies how to compute grammars based upon the visual hyperlinks present in a page. Nevertheless, in practice it can be difficult and ambiguous for the user to understand what vocabulary has been activated to enable the voice hyperlinks. Accordingly, a simplified methodology would be desirable for computing a grammar for navigating hyperlinks and activating elements that accept mouse input by voice.

SUMMARY OF THE INVENTION

The present invention addresses the deficiencies of the art in respect to multimodal page processing and provides a novel and non-obvious method, system and apparatus for enabling voice clicks in a multimodal page. In accordance with the present invention, a method for enabling voice clicks in a multimodal page can include toggling a display of indicia binding selected user interface elements in the multimodal page to corresponding voice logic; and, processing a selection of the selected user interface elements in the multimodal page through different selection modalities. In particular, the toggling step can include toggling a display of both indexing indicia for the selected user interface elements, and also a text display indicating that a voice selection of the selected user interface elements is supported.

In a specific aspect of the invention, the toggling step can include catching a voice utterance matching a pre-specified toggle grammar; and, calling a toggle method in script logic to perform the toggling of the display of indicia. Moreover, the toggling step can include the step of performing one of showing and hiding of the indicia binding the selected user interface elements in the multimodal page. By comparison, the processing step can include processing voice clicks for the selected user interface elements in the multimodal page through a voice modality. Additionally, the processing step can include catching a voice utterance matching a pre-specified click grammar; and, calling a click method in script logic to perform the selection of a selected one of the user interface elements.

A system for enabling voice clicks in a multimodal page can include script logic including both a toggle method programmed to toggle a display of indicia binding selected user interface elements in the multimodal page, and also a click method programmed to process a selection of the selected user interface elements in the multimodal page. The system also can include voice logic including both code programmed to call the toggle method in the script logic, and also code programmed to call the click method in the script logic. Finally, the system can include visual markup coupled to the voice logic and script logic. The visual markup can include attributes defining the selected user interface elements and marking the selected user interface elements for processing by the voice logic.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for enabling voice clicks in a multimodal page. In accordance with the present invention, a command and control grammar can be enabled for processing in conjunction with the rendering of a multimodal page. The command and control fragment can recognize and process voice commands for visually hiding and showing voice clickable elements in the multimodal page. Script logic further can be configured to toggle the display of the voice clickable elements, and to insert indicia adjacent to the voice clickable elements when not hidden so as to bind the voice clickable elements to the command and control grammar. In this way, voice clicks can be selectively enabled and disabled within a multimodal page without requiring the development of separate user interfaces to accommodate disparate modalities of interaction.

Figure 1A:
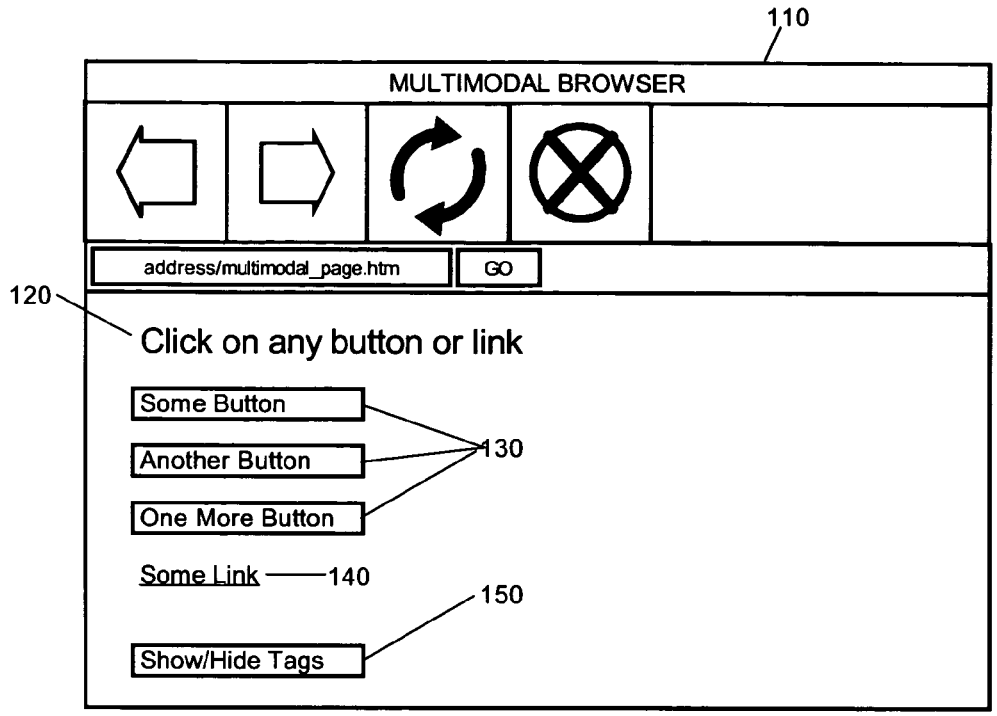
FIGS. 1A and 1B, taken together, are a pictorial illustration of a multimodal user interface configured to enable voice click navigation.
Figure 1B:
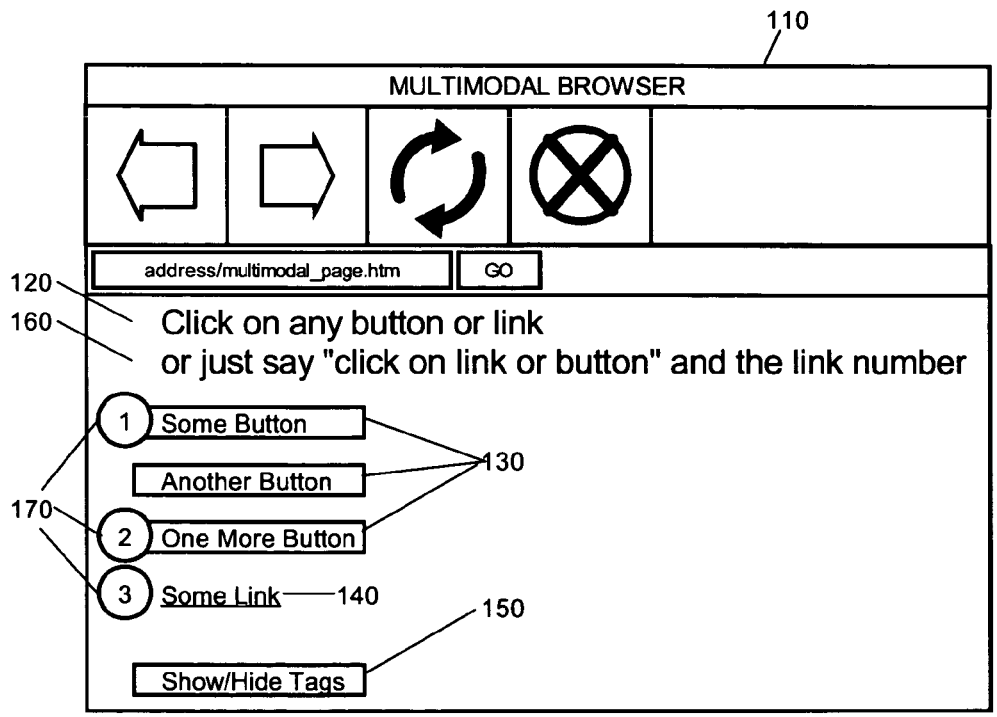

FIGS. 1A and 1B, taken together, are a pictorial illustration of a multimodal user interface configured to enable voice click navigation. Firstly referring to FIG. 1A, a multimodal content browser 110 can display markup language defined content which can include one or more user interface elements and textual, visual and audible content, to name a few. The user interface elements can include one or more buttons 130, 150 as well as one or more hyperlinks 140. Any of the buttons 130, 150 and hyperlinks 150 can be activated through a keyboard or pointing device selection of the buttons 130, 150 and hyperlinks 150. To guide a viewer in this regard, textual instructions 120 can be provided to bind the required action to the user interface elements.

Notably, the selection of the show/hide button 150 can incorporate a different modality of interaction into the content. Specifically, referring to FIG. 1B, responsive to the activation of the show/hide button 150, selected ones of the user interface elements can be annotated with visual indicia 170 indicating that the selected user interface elements can be activated through multiple modalities, such as by way of voice. Additionally, additional textual instructions 160 can be provided to bind the additional modality of interaction to the selected ones of the user interface elements.

Figure 2:
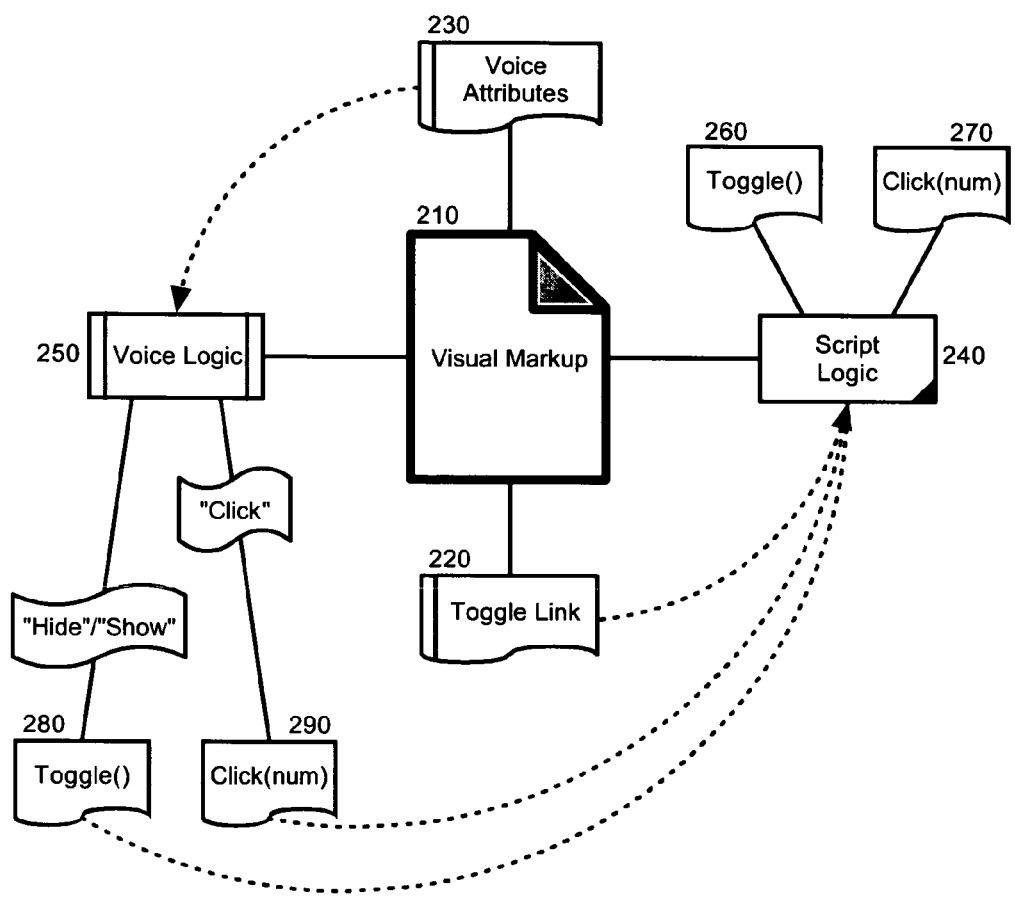
FIG. 2 is a schematic illustration of a system for enabling voice click navigation in a multimodal user interface; and, FIG. 3 is a flow chart illustrating a process for enabling voice click navigation in the multimodal user interface of FIG. 2.

To enable the multimodal operation of the content, a system can be arranged as shown in FIG. 2. Specifically, FIG. 2 is a schematic illustration of a system for enabling voice click navigation in a multimodal user interface. The system can include visual markup 210 which can include one or more attributes defining one or more user interface elements, including buttons, hyperlinks and the like. Additionally, the visual markup 210 can be configured to accommodate both visual attributes (not shown) and voice attributes 230. Specifically, selected ones of the user interface elements each can be labeled as a user interface element which can be activated through the voice modality. To that end, as an example, the visual markup 210 can conform to the V+C specification for integrating multimodal content elements in a single XHTML defined markup language document.

The voice attributes 230 can be operatively enabled by voice logic 250 which can include, for instance, VoiceXML specified grammars and logic. In this regard, the voice logic 250 can include program code defining the capturing of the voice commands "Hide", "Show" and "Click". Specifically, the voice logic 250 can include a toggle method 280 defining a responsive call to script logic 240 for a hide or show voice command. Also, the voice logic 250 can include a click method 290 defining a responsive call to script logic 240 for a click voice command.

The script logic 240 can include global program code which can be accessed either through the visual markup 210 or the voice logic 250. In particular, the script logic 240 can include a toggle method 260 and a click method 270. The click method 270 can accept an index as an input parameter to identify which indexed user interface element in the visual markup 210 is to be activated as if an end user had selected the indexed user interface element utilizing a traditional input method such as a pointing device or keyboard. The toggle method 260, by comparison, can toggle the hiding and showing of the voice bindings of selected user interface elements in the visual markup 210. As noted, the toggle method 260 can be activated either by the toggle method 280 in the voice logic 250, or through the direct selection of a visual toggle link 220 defined in the visual markup 210.

Figure 3:
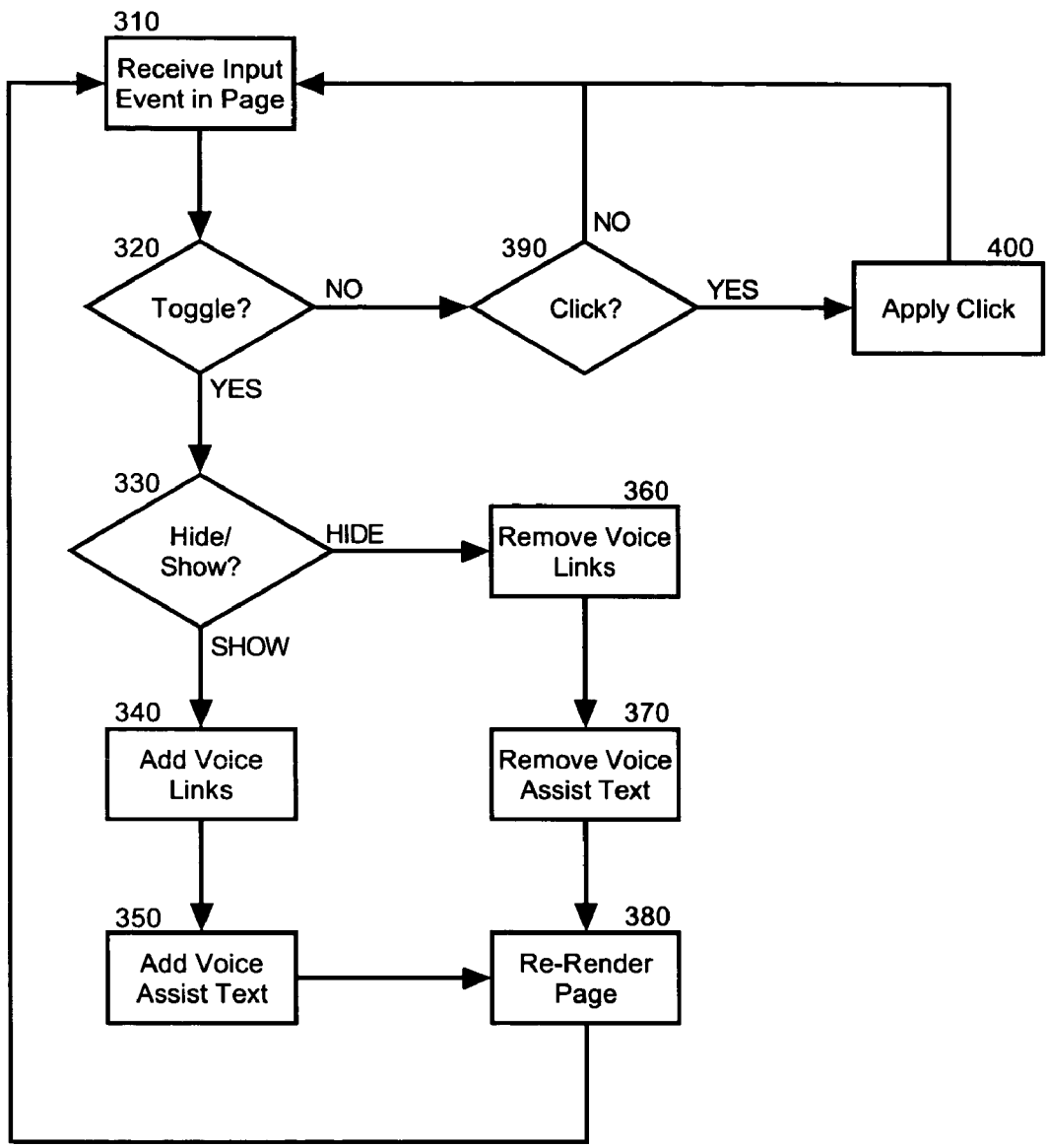

In more particular illustration of the operation of the toggle methodology, FIG. 3 is a flow chart illustrating a process for enabling voice click navigation in the multimodal user interface of FIG. 2. Beginning in block 310, an input event can be received in the markup language defined page. In decision block 320, it can be determined whether the event is a toggle event. If not, in decision block 390 it can be determined whether the event is a click event. If so, in block 400, a click can be applied to the specified user interface element.

If in decision block 320, it is determined that the event is a toggle event, in decision block 330 it can be determined whether to hide displayed ones of the multimodal user interface elements of the page, or whether to show hidden ones of the multimodal user interface elements. For a "show" event, in block 240 the voice links for each hidden multimodal user interface element can be added to the page and additional binding text can be added to the page as well in block 350. In contrast, for a "hide" event, in block 360 the voice links for each displayed multimodal user interface element can be removed from the page and the additional binding text can be removed from the page as well in block 370. In both cases, in block 380 the page can be re-rendered to effectuate the changes.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method for enabling voice clicks in a multimodal page displayed on a computer in a computing system, the method comprising acts of:
    toggling a display of and a hiding of a plurality of different voice modality indicia, each of the different voice modality indicia binding a different selected user interface element in the multimodal page to different corresponding voice logic executable in the computing system to indicate that the user interface element is voice-enabled, wherein each of the different voice modality indicia displays information, that when spoken in combination with at least one voice command, selects the user interface element; and
    processing a selection of selected user interface elements in the multimodal page through different selection modalities.

2. The method of claim 1, wherein said toggling act comprises toggling a display of and a hiding of both a plurality of different indexing indicia for corresponding selected user interface elements, and also a text display indicating that a voice selection of said corresponding selected user interface elements is supported.

3. The method of claim 1, further comprising acts of:
    receiving a voice utterance matching a pre-specified toggle grammar; and,
    calling a toggle method in script logic to perform said toggling.

4. The method of claim 1, wherein said processing act comprises processing voice clicks for selected user interface elements in the multimodal page through a voice modality.

5. The method of claim 1, wherein said processing act further comprises acts of:
    receiving a voice utterance matching a pre-specified click grammar; and
    calling a click method in script logic to perform said selection of a selected one of said user interface elements.

6. A machine readable storage having a computer program stored thereon, the computer program comprising a set of instructions that, when executed by a computer, perform a method comprising acts of:
    toggling a display of and a hiding of a plurality of different voice modality indicia, each of the different voice modality indicia binding a different selected user interface element in the multimodal page to different corresponding voice logic executable in the computing system to indicate that the user interface element is voice-enabled, wherein each of the different voice modality indicia displays information, that when spoken in combination with at least one voice command, selects the user interface element; and
    processing a selection of selected user interface elements in the multimodal page through different selection modalities.

7. The machine readable storage of claim 6, wherein said toggling act comprises toggling a display of and a hiding of both a plurality of different indexing indicia for corresponding selected user interface elements, and also a text display indicating that a voice selection of said corresponding selected user interface elements is supported.

8. The machine readable storage of claim 6, wherein said toggling act further comprises acts of:
    receiving a voice utterance matching a pre-specified toggle grammar; and
    calling a toggle method in script logic to perform said toggling.

9. The machine readable storage of claim 6, wherein said processing act comprises processing voice clicks for selected user interface elements in the multimodal page through voice modality.

10. A computer-implemented method, comprising:
    associating at least one voice modality indicia with a user interface element of a multimodal page displayed on a computer to indicate that selection of the user interface element is voice enabled, wherein the at least one voice modality indicia displays information that, when spoken in combination with at least one voice command by a user of the computer, selects the user interface element.

11. The computer-implemented method of claim 10, further comprising:
    hiding, in response to receiving a hide voice command, the at least one voice modality indicia for the user interface element to indicate that selection of the user interface element using a voice modality is disabled.

12. The computer-implemented method of claim 10, wherein associating comprises binding the user interface element to corresponding computer-executable voice logic.

* * * * *

UNITED STATES PATENT AND TRADEMARK OFFICE
CERTIFICATE OF CORRECTION

| | | |
|---|---|---|
| PATENT NO. | : 7,650,284 B2 | Page 1 of 1 |
| APPLICATION NO. | : 10/992979 | |
| DATED | : January 19, 2010 | |
| INVENTOR(S) | : Cross et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1135 days.

Signed and Sealed this

Twenty-third Day of November, 2010

David J. Kappos
*Director of the United States Patent and Trademark Office*